March 28, 1967     M. J. DI TORO     3,311,836
SYSTEM FOR TRANSLATING PULSE SIGNALS ACCOMPANIED
BY SPURIOUS SIDE PULSES
Filed Dec. 7, 1964     6 Sheets-Sheet 1

| No. | $z^{+8}$ | $z^{+7}$ | $z^{+6}$ | $z^{+5}$ | $z^{+4}$ | $z^{+3}$ | $z^{+2}$ | $z^{+1}$ | $z^0$ | $z^{-1}$ | $z^{-2}$ | ITEM |
|---|---|---|---|---|---|---|---|---|---|---|---|---|
| 1 | | | | | | | -.60 | 0 | 1 | .40 | | I |
| 2 | | | | | | | .60 | 0 | 1 | | | $H_{cor,1}$ |
| 3 | | | | | -.36 | 0 | 0 | .24 | 1 | .40 | | $I \cdot H_{cor,1}$ |
| 4 | | | | | | | .60 | 0 | 1 | -.40 | | $H_{cor,2}$ |
| 5 | | | | | -.36 | | 0 | .48 | 1 | 0 | -.16 | $I \cdot H_{cor,2}$ |
| 6 | | | | | | | .60 | -.48 | 1 | -.40 | | $H_{cor,3}$ |
| 7 | | | | | -.36 | .29 | 0 | 0 | .81 | 0 | -.16 | $I \cdot H_{cor,3}$ |
| 8 | | | | | | .36 | 0 | .60 | -.48 | 1 | -.40 | $H_{cor,4}$ |
| 9 | | | -.22 | 0 | 0 | .43 | 0 | 0 | .81 | 0 | -.16 | $I \cdot H_{cor,4}$ |
| 10 | | | | | .36 | -.43 | .60 | -.48 | 1 | -.40 | | $H_{cor,5}$ |
| 11 | | | -.22 | .26 | 0 | 0 | -.17 | 0 | .81 | 0 | -.16 | $I \cdot H_{cor,5}$ |
| 12 | | | | -.26 | .36 | -.43 | .60 | -.48 | 1 | -.40 | | $H_{cor,6}$ |
| 13 | | .16 | -.22 | 0 | -.10 | 0 | -.17 | 0 | .81 | 0 | -.16 | $I \cdot H_{cor,6}$ |
| 14 | | | .22 | -.26 | .36 | -.43 | .60 | -.48 | 1 | -.40 | | $H_{cor,7}$ |
| 15 | -.13 | 0 | 0 | .09 | -.10 | 0 | -.17 | 0 | .81 | 0 | -.16 | $I \cdot H_{cor,7}$ |
| | | | | | | | etc. | | | | | |

United States Patent Office 3,311,836
Patented Mar. 28, 1967

3,311,836
SYSTEM FOR TRANSLATING PULSE SIGNALS
ACCOMPANIED BY SPURIOUS SIDE PULSES
Michael J. Di Toro, Massapequa, N.Y., assignor to Cardion Electronics, Inc., a corporation of Delaware
Filed Dec. 7, 1964, Ser. No. 416,288
14 Claims. (Cl. 328—167)

This invention relates to systems for translating signals of any wave form received through a medium in which the transmission of a pulse signal is accompanied by spurious side pulses. When the transmitted signals comprise a series of pulses, the use of the translating sytem of the invention results in the substantial suppression of the spurious side pulses. The invention is particularly useful in channels of the type including a link subject to noise, dispersion, and wave-form distortion arising from multipath, group delay distortion, and the like, for example as characterizes the earth-ionosphere duct, and effective to cause intersymbol interference.

It is well known that single-path signal-translating channels having moderate signal-to-noise ratios, a linear phase-frequency characteristic, and a flat amplitude-frequency characteristic to a cutoff frequency of $f_c$ can ideally translate, without intersymbol interference, pulses of various amplitudes at the rate of about $2f_c$ pulses per second. Most current data-transmission channels achieve only a fraction of such a pulse rate, either because their nonlinear phase-frequency characteristics cause at the output a dispersion or lengthening of the time of each pulse transmitted much beyond the theoretical value $\frac{1}{2}f_c$ or because of unintentional multipath links in the channel which give rise to ghosts or side pulses which may be of either greater or lesser amplitude than the main pulse and of either polarity, or because the channel is subject to both of these distorting factors.

In applicant's copending applications Ser. No. 180,456, filed Mar. 19, 1962, Ser. No. 201,148, filed June 8, 1962, and Ser. No. 332,492, filed Dec. 23, 1963, there are described and claimed apparatus for correcting signal dispersion and distortion in systems of the type described and effective substantially to eliminate intersymbol interference. For high-speed random serial data transmission, the effects of both noise and intersymbol interference arising from dispersion and distortion in the translating channel combine in a random and uncorrelated manner. In such cases, it is a desirable objective to reduce, for example, the mean variance between the multilated received signal and a delayed clean transmitted signal. The present invention represents an implementation for this and other objectives and constitutes an improvement upon and an extension of the inventions described and claimed in the aforesaid copending applications.

The present invention is based upon the principle that if a transmitted signal representative of a stream of pulses is received distorted or dispersed, or both, by multipath, group delay distortion, etc., so that each constituent pulse of the received signal is actually received as a primary pulse and an array of spurious side pulses, causing severe intersymbol interference with other constituent pulses of the signal stream, it is possible to correct the received signal by cancelling out or "relaxing" the individual spurious pulses one at a time or in unison. The present invention comprises simplified circuitry for effecting such relaxation.

It is an object of this invention, therefore, to provide a new and improved correcting network for a wave-signal translating system, including a noisy signal-dispersing and distorting link, which reduces signal multilation from noise and intersymbol interference to a minimum.

It is another object of the invention to provide a new and improved correcting network for a wave-signal translating system, including a signal-dispersing and distorting link, which reduces intersymbol interference to a minimum irrespective of whether the pulse arriving first is of a greater or lesser amplitude than, or of the same or different polarity from, that of succeeding pulses.

It is another object of the invention to provide a new and improved correcting network for a wave-signal translating system, including a signal-dispersing and distorting link, which is effective to correct for any type of dispersion and distortion due to multipath transmissions, group delay distortion, etc., and combinations thereof.

It is a still further object of the invention to provide a new and improved correcting network for a wave-signal translating system, including a signal-dispersing and distorting link, which reduces intersymbol interference to a minimum and in which the correcting network may be adjusted to compensate for variations of the transfer characteristic of the link with respect to time.

In accordance with the invention, there is provided a system for translating a signal comprising a primary pulse and spurious minor side pulses with substantial suppression of said side pulses comprising an input circuit for supplying a signal to be translated, an output circuit, and an N-section wave-signal delay network coupled between the input and output circuits, each section including a central connection tap and a plurality of connection taps symmetrically spaced relative to the central tap. Each section of the delay network includes means for deriving a signal corresponding to an input signal with a delay equal to that at the central tap, and the first section of the delay network includes means for sensing the instantaneous signal voltages at the central tap and at each of the plurality of taps on one side thereof in response to the distribution of an input signal along such network section. A plurality of signal-repeating means are included in each section of the delay network, individually responsive to the polarity of such instantaneous signal at each given one of the plurality of taps for coupling the corresponding symmetrically disposed tap to the output circuit with alternatingly reversed polarity. The system further comprises means for summing the signal outputs of the signal-repeating means and adding the summation signal to the derived signal, means for applying to the output circuit the sum of the summation signal and the derived signal of the final section of the delay network, means for detecting a predetermined characteristic of the side pulses at the output circuit, means for adjusting the various gains of all the signal-repeating means above and below a nominal value, and means for setting the gains of all the signal-repeating means in a sense to reduce the value of such predetermined characteristic at the output circuit.

For a better understanding of the present invention, together with other and further objects thereof, reference is had to the following description, taken in connection with the accompanying drawings, while its scope will be pointed out in the appended claims.

Referring to the drawings:

FIGS. 10 and 11 are curves to aid in explanation of the operation of the system of FIG. 6, while

Before describing the signal-translating system for correcting distortions of the type described, it is believed that it would be helpful to discuss the analytical basis of the invention which involves what may be termed "relaxation" processes, wherein the undesired initial multipath signals and subsequent side pulses are successively cancelled or relaxed toward zero.

Assume that a delta-function represented pulse has been received via, for example, the earth-ionosphere duct, having an impulse response:

$$I = -0.6z^2 + 0z + 1 + 0.4z^{-1} \quad (1)$$

using the notation of the Z transform $z = \epsilon^{-p}$ = unit time delay or sampling time cell $p$ = the usual complex variable of the La Place or Fourier Transforms $az^{-n}$ = impulse of amplitude (or, more precisely, of area) $a$ delayed in time by $n$ time cells.

Figure 1:
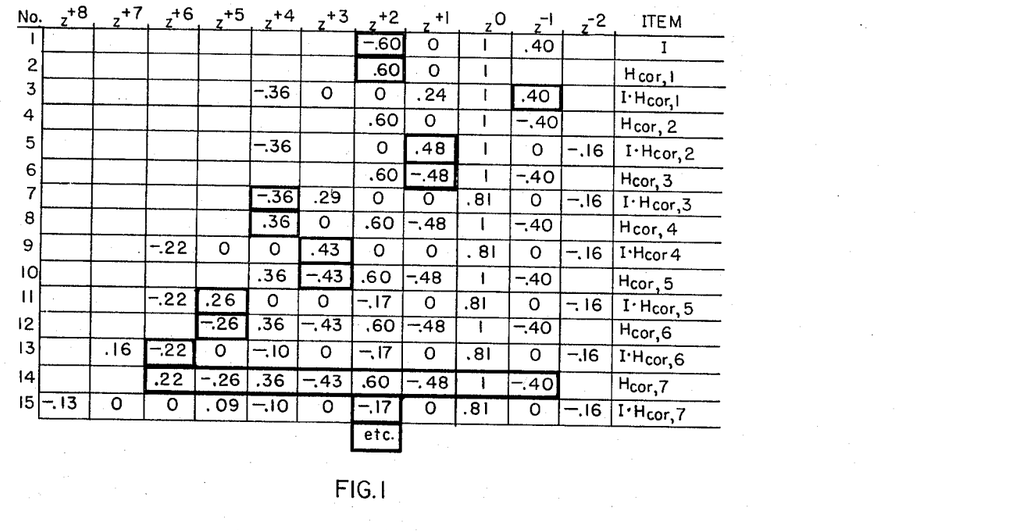
FIG. 1 is a table illustrating successive cancellations of spurious side pulses of greatest amplitude of a received distorted pulse signal.

The foregoing Equation 1 is represented by the first line in the table of FIG. 1. In applying the relaxation process to such a signal, the largest multipath side pulse $-0.6$ is located. To cancel or relax it, the received signal is multiplied by 0.6 and advanced (that is, displaced in time in a sense opposite to delay) by two time cells $z^2$ and then added to itself. This is done using a correction network of impulse response $H_{cor,\,1} = 0.6z^2 + 1$, as shown in FIG. 1, line 2. For physical realizability, the correction network actually has an impulse response $$z^{-2}(0.6z^2 + 1)$$

to avoid unrealizable response before zero time. When the received multipath signal I is passed through $H_{cor,\,1}$, the output $I \cdot H_{cor,\,1}$ is shown in FIG. 1, line 3. Note that the undesired side pulse of $-0.6$ has been relaxed or reduced to zero.

Continuing, the largest residual side pulse 0.4 of $I \cdot H_{cor,\,1}$ is chosen and cancelled or relaxed, using a delay-line tap of value $-0.4$ at the retarded time cell $z^{-1}$. The impulse response of the correction network now becomes $H_{cor,\,2} = 0.6z^2 + 1 + (-0.4)z^{-1}$, as shown in FIG. 1, line 4. When I is fed into $H_{cor,\,2}$, the output $I \cdot H_{cor,\,2}$ is shown in FIG. 1, line 5.

Figure 2:
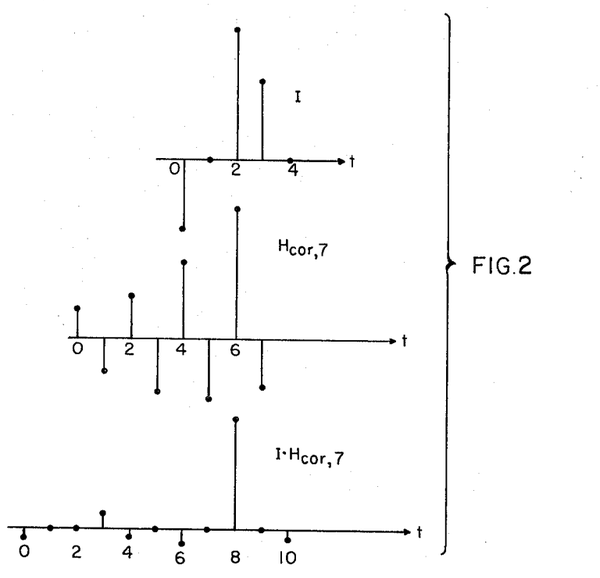
FIG. 2 is a graph representing certain of the data of FIG. 1.

Proceeding in this manner with the process of successive relaxations as shown in FIG. 1, after relaxation of the seventh side pulse, the response of the correction network $H_{cor,\,7}$ becomes that shown in FIG. 1, line 14. Again, when I is fed into $H_{cor,\,7}$, the output $I \cdot H_{cor,\,7}$ is shown in FIG. 1, line 15. Graphs of I, $H_{cor,\,7}$, and the over-all output $I \cdot H_{cor,\,7}$ are shown in FIG. 2. The network $H_{cor,\,7}$ is physically realized as a seven-section tapped delay whose over-all impulse response is:

$$H_{cor,\,7} = 0.22 - 0.26z^{-1} + 0.36z^{-2} - 0.43z^{-3} + 0.60z^{-4} \\ -0.48z^{-5} + z^{-6} - 0.40z^{-7} \quad (2)$$

As indicated, because positive values of ($z$) are not physically realizable, representing anticipatory events in advance of time zero, it is necessary to multiply line 14 of FIG. 1 by $z^{-6}$. This simply shifts time zero to the sixth precursor time cell. Such a time shift is shown in the graphs of FIG. 2, in which the primary pulse of the corrected over-all output $I \cdot H_{cor,\,7}$ has a delay of eight time cells ($z$).

Figure 3:
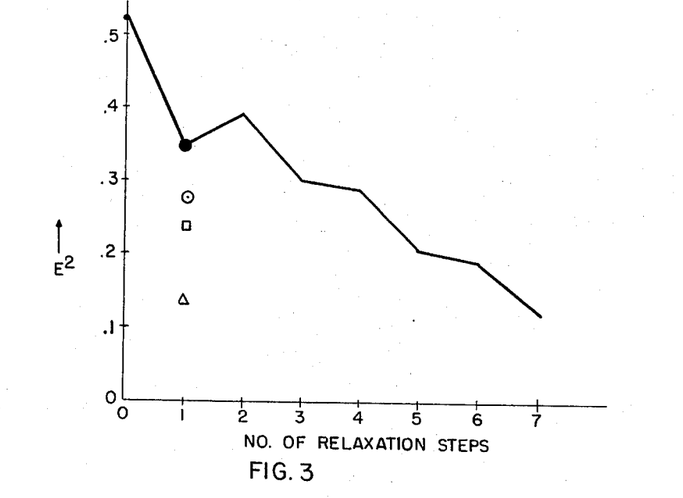
FIG. 3 is a graph of the residual-sum-squared of the side pulse errors corresponding to the several corrections of FIG. 1.

The sum of the squares of the residual side pulses in the over-all corrected output $I \cdot H_{cor,\,7}$ is 0.126. It is computed as the sum of squares of all the residual terms other than the primary pulse, including a penalty of $1 - 0.81 = 0.19$ for the attenuation of the primary pulse. This is a primary pulse/squared-side-pulse-sum ratio of 9 db. The squared-side-pulse-sum (hereinafter for brevity referred to as the "squared sum") in the received signal I is 0.52, giving 2.8 db for the primary pulse/squared-sum ratio. The network $H_{cor,\,7}$ has thus increased this ratio by 6.2 db, using a delay line with only seven delay cells. In actual practice, a value of 20 db or more of increase or improvement in this ratio is obtainable by continuing the process beyond that of FIG. 1 to include some fifty delay-line sections. FIG. 3 is a curve of the residual squared-sum error in the corrected signal for each of the successive steps of FIG. 1, that error being reduced from a value of 0.52 in the uncorrected signal to 0.13 after the seventh correction.

The automatic implementation of the foregoing numerical process will be described below. However, there are alternate ways in which the residual squared-sum error can be reduced more quickly, using a lesser number of steps. One method rests on the observation that, in the cancellation of any spurious side pulse by passing the distorted signal through a tapped delay with an adjustable-gain signal repeater at each tap, there exists an optimum value of gain at each tap which minimizes the residual squared-sum error. Another method utilizes the expediency of reduction of side pulses all at once, rather than pulse-by-pulse or section-by-section. As will be shown, this can yield improved results using also an optimum tap gain.

Thus, let the multipath impulse response (e.g., of the earth-ionosphere duct) be:

$$I(z) = \sum_{-m}^{+m} a_v^{-v} = 1 + R(z) \quad (3)$$

where $$R(z) = a_{-m}z^m + a_{-m+1}z^{m-1} + \ldots \\ + a_{-1}z^1 + 0 + a_1z^{-1} + \ldots + a_m z^{-m}$$

Equation 3 indicates that the received multipath baseband signal, on transmission of an impulse, comprises a desired primary pulse of reference unity magnitude and undesired side pulses $a_{-m}$ to $a_m$ (excluding $a_0$) which are to be mitigated by the methods disclosed herein. For example, in line 1 of FIG. 1, the undesired side pulses are: $a_{-2} = -0.60$, $a_{-1} = 0$, $a_1 = 0.40$, $a_2 = 0$.

Assume that any given side pulse $a_w$ in Equation 3 is the largest multipath signal which is to be relaxed using, as shown above, a correcting delay-line network of impulse response:

$$H_{cor,1} = 1 - (a_w g_w)z^{-w} \quad (4)$$

This impulse response comprises a unity pulse at zero time cell and a pulse of value $-(a_w g_w)$ at the time-delay cell of $w$. For convenience, this coefficient $-(a_w g_w)$ is expressed as the product of a gain $g_w$ multiplied by the value of $a_w$ in Equation 3 corresponding to the time cell $w$. For example, in FIG. 1, line 2, for $w = -2$, so that $z^{-w} = z^2$, $a_w = -0.6$ and $g_w = +1$.

It can be shown that, in relaxing undesired side pulses one by one, there is one "best" value of $-(a_w g_w)$ to use, which is defined, for example, as that value which minimizes the residual squared-sum error in $I \cdot H_{cor,\,1}$ and is given by:

$$(a_w g_{w,opt}) = \frac{a_w + (RR_c)_w}{1 + (RR_c)_0} \quad (5)$$

where $R_c$ = the conjugate of R, obtained by replacing $z$ by $z^{-1}$ in R $(RR_c)_0$ = the coefficient of the $z^0$ term in $RR_c$
$(RR_c)_w$ = the coefficient of the $z^{-w}$ term in $RR_c$, which is also the coefficient of the $z^w$ term.

Equation 5 gives the optimum gain settings of the correction delay-line network $H_{cor, 1}$ (Equation 4) which is used in the relaxation of the $a_w$ side pulse in $I(z)$.

In contradistinction to this, for example, the relaxation of the side pulse $a_{-2} = -0.60$ is done in FIG. 1 by the use of a delay-line section having a signal output $-(a_{-2}g_{-2}) = +0.60$ and a gain value of $+1$. As shown in FIG. 3, this relaxes the residual squared-sum error from its initial value of 0.52 to the lower value of 0.35, as indicated by the filled-in dot.

The teaching of Equation 5 is that a smaller residual squared-sum error than 0.35 is obtained if the tap gain is that obtained by the indicated formula. For this example, this optimum gain resulting in minimum residual squared-sum error is computed by Equation 5 as $$g_{-2} = +0.70$$

The latter gain results in a residual squared-sum error of 0.27, as indicated by the open dot in FIG. 3. The use of Equation 5 always assures that the residual error gets smaller or, in rare cases, remains unchanged; it can never, however, get larger. The latter case actually occurs, as in FIG. 1, line 5 or in FIG. 3, step 2, because arbitrarily unity gain has been used rather than that indicated by Equation 5.

If all the residual side pulses are relaxed at once, the optimum value of tap gain $g_{opt}$ and transfer function $H_{cor, 1}$ which minimize the squared-sum error, are:

$$g_{opt} = \frac{(RR_c)_0 + (R^2R_c)_0}{(RR_c)_0 + 2(R^2R_c)_0 + R^2R_c^2)_0} \quad (6)$$

$$H_{cor} = (1 - g_{opt}R)z^{-m} \quad (7)$$

Thus, when all residual side pulses are reduced simultaneously, e.g., by using one filter correction stage of the type described and claimed in applicant's copending application Ser. No. 201,148, filed June 8, 1962, and using the same gain at all taps, the optimum value of this common gain for the signal represented in FIG. 1, line 1, as computed by Equation 6 (or, equivalently, from Equation 11 of said application), is $+0.575$ and the resulting residual squared-sum error is the smaller value of 0.222, as indicated in FIG. 5C, and in FIG. 3 by the open square.

In this method of reduction of side pulses, unlike that represented by Equation 5, the value of $g_{opt}$ is independent of $w$ and is the same for each tap. The value of the delay-line tap is again, by notation, the product $$-(a_w g_{opt})$$

Figure 5:
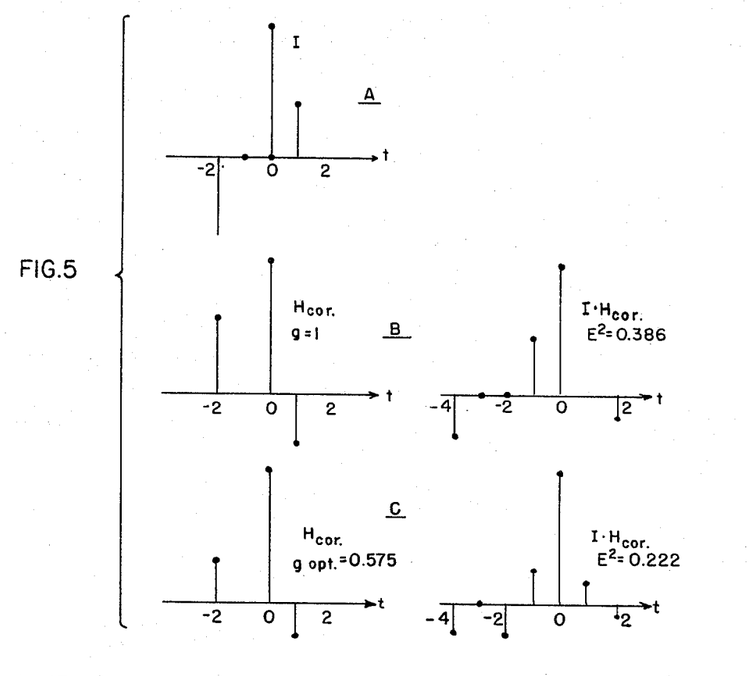
FIG. 5 is a graph representing the reduction in the side pulses by the relaxation process of FIG. 1 for different values of gain.

An application of Equations 6 and 7 to the example of FIG. 1 is shown in FIG. 5 in which A represents the same multipath response I as in FIG. 1, line 1. The correction network having the translation characteristic represented by B (left hand) is for the case where a non-optimum value of $g = +1$ is arbitrarily used. This is the same characteristic as represented by row No. 4 of FIG. 1, the resultant output being row No. 5 of FIG. 1 and B (right hand) of FIG. 5 and representing a residual squared-sum error of 0.386. If a similar correction network having a translation characteristic represented by C (left hand) of FIG. 5, using an optimum gain of $$g_{opt} = 0.575$$

as computed using Equation 6, the resultant output $(I \cdot H_{cor})$ of C (right hand) shows that the residual squared-sum error has been reduced from 0.386 of B to 0.222 of C.

The present invention comprises apparatus for implementing the foregoing processes of relaxation of the spurious side pulses of a delta-function pulse distorted and dispersed by transmission, either simultaneously or sequentially, to achieve the optimum correction in terms, for example, of the minimum residual squared-sum error.

Figure 6:
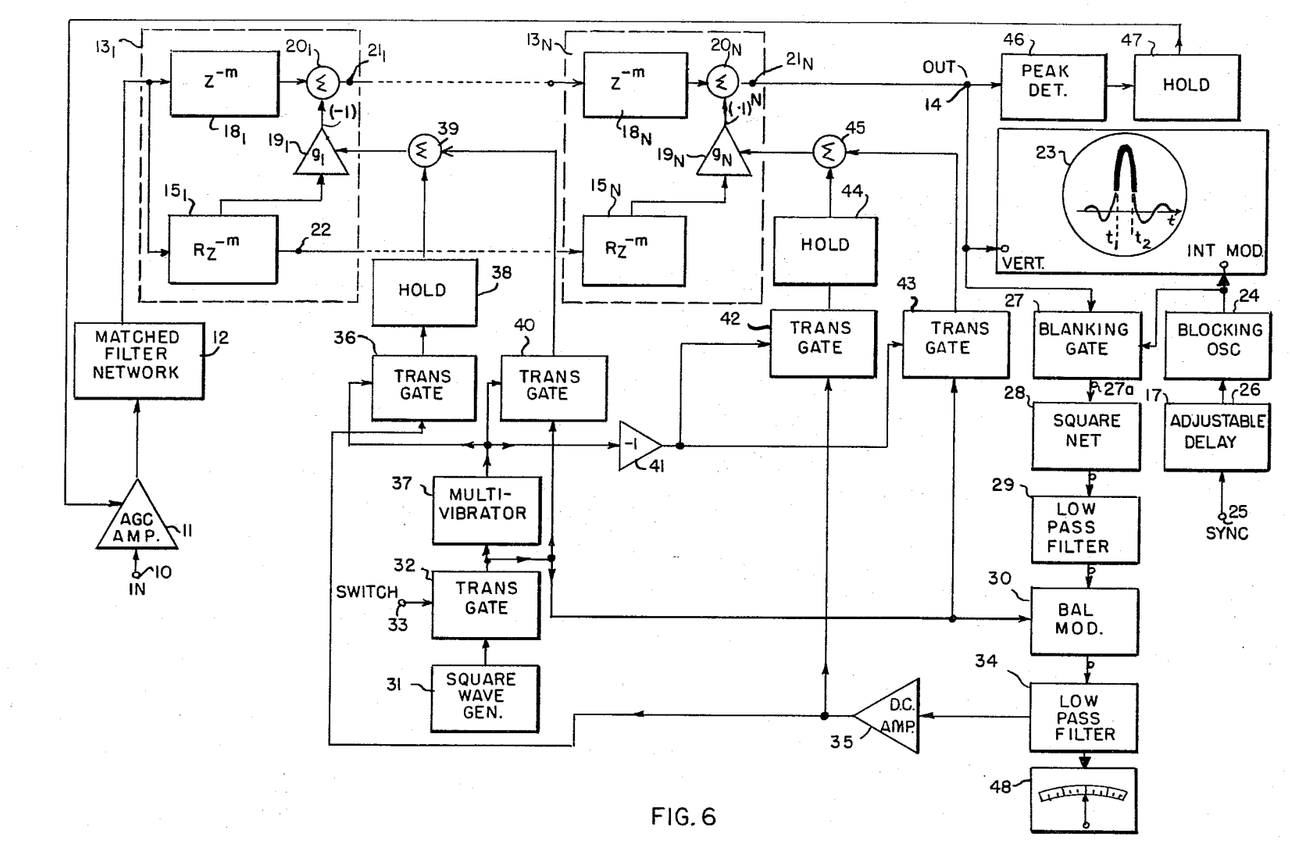
FIG. 6 is a schematic circuit diagram of a complete system embodying the present invention for translating a signal comprising a primary pulse and spurious minor side pulses with substantial suppression of the side pulses.

Equation 6 defines the optimum value of gain for each section of the correcting delay network for relaxing undesired side pulses in unison. A system utilizing the relation of Equation 6 is shown in FIG. 6, which comprises a system for translating a signal comprising an array of pulses including a primary pulse of unit reference magnitude and a stream of spurious side pulses $$a_{-m} \ldots a_{-1}, a_1 \ldots a_m$$

all of lesser magnitude and represented in the Z-transform notation by Equation 3, with substantial suppression of the side pulses. This system includes an input circuit or terminal 10 for supplying the signal to be translated, connected by way of an AGC amplifier 11 and a matched filter network 12 to the first section $13_1$ of an N-section wave-signal delay network, the last section $13_N$ of which is coupled to an output circuit or terminal 14. The matched filter network 12 may be of the type described and claimed in applicant's aforesaid copending application Ser. No. 180,456, having a normalized output of the form of Equation 3 with all of the spurious side pulses $a_w$ having less than unity magnitudes.

Included in the delay network section $13_1$ is a so-called reciprocal filter $15_1$ of the type described and claimed in applicant's aforesaid copending application Serial No. 201,148 and having a translation characteristic $R_\epsilon(-p_m$ or $Rz^{-m}$. The network $13_1$ may take the form shown in more detail in FIG. 7 or FIG. 8 and includes a delay line 16 having a central connection tap $16a$ and a plurality, at least $2m$, of connection taps $16b$ symmetrically spaced relative to the central tap $16a$, the line 16 being terminated in its characteristic impedance $Z_0$. The electrical spacing of adjacent connection taps is equal to the spacing of the closest or adjacent pulses in the received signal. As described in aforesaid copending application Ser. No. 201,148, the delay network $15_1$ will additionally include a plurality of signal-repeating means individually responsive to the polarity of the instantaneous signal at each of the connection taps $16b$ for coupling the corresponding symmetrically disposed tap to its output circuit with reversed polarity but, for the sake of simplicity, the details of that feature are not herein repeated. However, the network $15_1$ includes signal-repeating means, such as the amplifiers 17, individually connected at the connection taps $16b$ for coupling the taps to its output circuit. Thus, the repeaters 17 sense the instantaneous side pulse voltages $a_{-m} \ldots a_{-1}, a_1 \ldots a_m$ at the symmetrically spaced connection taps $16b$ in response to the distribution of an input signal along the network section.

Each of the network sections, such as the section $13_1$, includes a circuit for deriving a signal corresponding to the input signal with a delay $z^{-m}$ equal to that at the central tap of delay network 16. In general, this will take the form of FIG. 7, including a second or auxiliary wave-signal delay network 18 having a delay $z^{-m}$ one-half that of the entire delay network 16. However, in the initial delay network section $13_1$, a signal having a delay $z^{-m}$ may be derived directly from the central connection tap $16a$ of network 16, thereby eliminating the requirement for the auxiliary delay network 18 of FIG. 7 or the delay network $18_1$ of FIG. 6.

Figure 7:
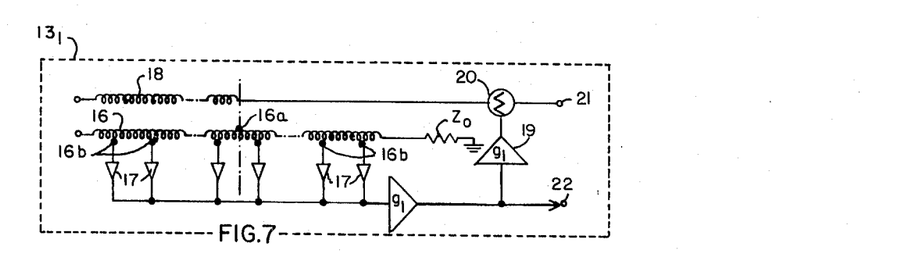
FIGS. 7 and 8 are circuit diagrams of certain components of the system of FIG. 6.
Figure 8:
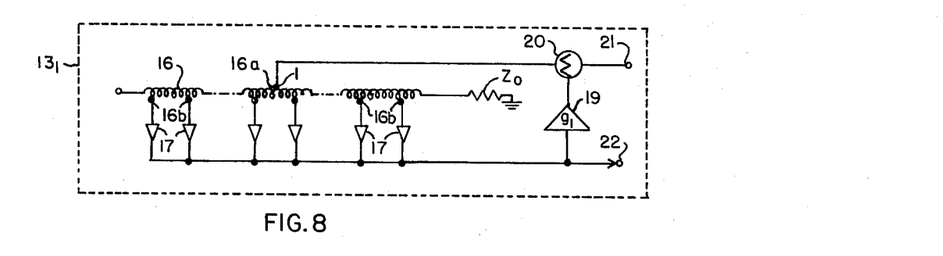

There are also provided means in each section of the network, such as section $13_1$, for summing the signal outputs of the several signal-repeating means connected to the symmetrically disposed connection taps of the delay network 16 and adding the summation signal to the derived signal having a delay $z^{-m}$, as described above. In the arrangements of both FIGS. 7 and 8, the signal having the delay $z^{-m}$, whether derived from the auxiliary delay line 18 of FIG. 7 or the central connection tap $16a$ of FIG. 8, is added to the summation signal from the several repeaters 17 via an adjustable-gain signal repeater 19 in a summation amplifier 20, the total signal appearing at output terminal 21.

The resultant translation characteristic of the delay network section $13_1$ is thus represented by the expression:

$$H_{cor,\ 1}=(1-g_1R)z^{-m} \qquad (8)$$

where $g_1$=the gain of the signal repeater $19_1$. It is apparent that $H_{cor,\ 1}$ of Equation 8 corresponds in form to $H_{cor,\ 1}$, of FIG. 1, line 4, with the addition of the gain factor $g_1$ to provide optimum gain rather than just unity gain of FIG. 1.

By the use of a single delay network section, such as the section $13_1$ of FIG. 6, the residual squared-sum error is that represented for a single section in FIG. 5C. Usually, however, it is desirable to provide a large number of sections like section $13_1$. In FIG. 6, the dotted line extensions represent such an N-section system terminating in the section $13_N$. As shown also in FIG. 7, the output terminal 21 of the network 18 of each section is coupled to the input terminal of the network 18 of the succeeding section while an auxiliary output terminal 22 of the delay network 15 of each section, at which appears the summation of the signals of the several signal repeaters 17, is coupled to the input of the delay network 15 of the succeeding section, the circuit connections being such that the sum of such summation signal and the signal derived by the network $18_N$ of the final section $13_N$ of the system are combined and applied to the final output terminal 14.

The signal-translating channel comprising the network sections $13_1$ . . . $13_N$ corresponds to the channel of FIG. 3 of aforesaid application Ser. No. 201,148 and the present invention provides means for automatically adjusting the gains of the signal repeaters 19 to provide, for example, a minimum residual squared-sum error. If the received distorted and dispersed signal comprises a primary pulse of an amplitude larger than any of the spurious side pulses, the matched filter network 12 of FIG. 6 may be omitted and the input signal applied directly to the network section $13_1$. If any of the spurious side pulses are of an amplitude equal to or greater than that of the primary pulse of the received signal, it is applied first to the matched filter network 12 of the type described and claimed in aforesaid copending application Ser. No. 180,456. As described in that application, the network 12 is effective always to yield a primary pulse of greater magnitude than that of the spurious side pulses so that the signal is suitable for further correction by the signal-translating channel of the present invention.

The transfer function for a one-section ($N=1$) network of FIG. 6 is:

$$H_{cor,\ 1}=z^{-m}(1-g_1R) \qquad (9)$$

The transfer function for an N-section network, from the input section $13_1$ to the final output terminal 14 is:

$$H_{cor,\ N}=z^{-mN}(1-g_1R+\ \ldots\ +(-1)^Ng_NR^N) \qquad (10)$$

When the signal input to the system is I and then transfer function of the channel is as represented by Equation 10, the output signal comprises a primary pulse at time cell $-mN$ and an array of residual side pulses. For a system comprising two network sections ($N=2$, FIG. 6), it can be shown that the residual squared-sum error is represented by the expression:

$$E^2=K_1g_1^2+K_2g_1g_2+K_3g_2^2$$
$$+K_4g_1+K_5g_2+K_6 \qquad (11)$$

where $K_1=(RR_c)_0+2(R^2R_c)_0+(R^2R_c^2)_0$
$-K_2=2((R^2R_c)_0+(R^3R_c)_0+(R^2R_c^2)_0+(R^3R_c^2)_0)$
$K_3=(R^2R_c^2)_0+2(R^3R_c^2)_0+(R^3R_c^3)_0$
$-K_4=2((RR_c)_0+(R^2R_c)_0)$
$K_5=2((R^2R_c)_0+(R^3R_c)_0)$
$K_6=(RR_c)_0$ The several constants $K_1$ to $K_6$ are functions of the amplitudes of the side pulses of a received signal as defined by R(z) of Equation 3.

It can be shown that the residual squared-sum error of Equation 11 for a two-section delay network is a minimum when the gain $g_1$ of the first network section $13_1$ and the gain $g_2$ of the second network section $13_2$ have the values:

$$g_{1,\ opt}=\frac{2K_3K_4-K_2K_5}{4K_1K_3-K_2^2} \qquad (12)$$

$$g_{2,\ opt}=\frac{K_2K_4-2K_1K_5}{4K_1K_3-K_2^2} \qquad (13)$$

Figure 4:
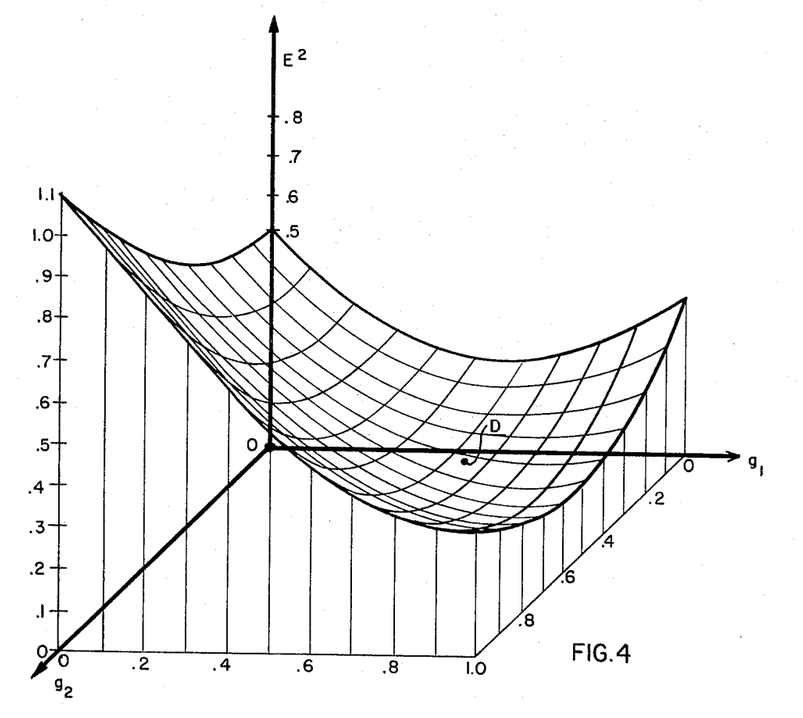
FIG. 4 is a perspective three-dimensional diagram of a quadratic surface representing the residual-sum-squared of the side pulse errors.

Applying Equations 11, 12, and 13 to the signal represented by FIG. 1, line 1, the result is a residual squared-sum error of 0.13, as indicated by the open triangle in FIG. 3. The optimal gains are $g_{1,\ opt}=+0.749$ and $g_{2,\ opt}=+0.410$. FIG. 4 shows a plot of Equation 11 showing the residual square-sum error $E^2$ for the assumed received signal. It is noted that $E^2$ is a two-dimensional quadratic surface in the ($g_1, g_2$) coordinate system, having an initial value of 0.52 when both gains are zero, this value corresponding to the spurious side pulses as received, and having a minimum value of 0.13 at the coordinate pair at the point D ($g_2=+0.749$, $g_2=+0.410$) although the minimum does not appear too clearly on the three-dimensional perspective. As is true of all optimal adjustments, not only is $E^2$ desirably minimum here, but its rate of variation in the vicinity of the optimal coordinates is small, thus resulting in a noncritical setting of the two gains $g_1$ and $g_2$.

Figure 9:
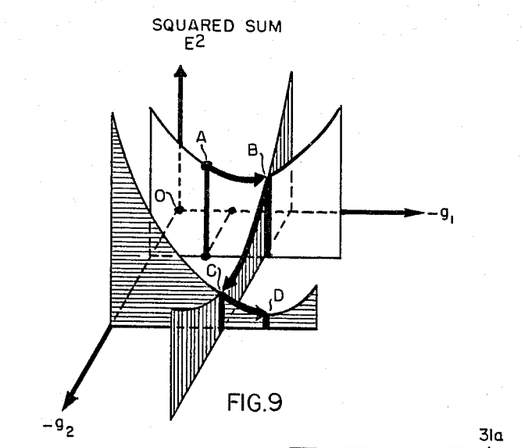
FIG. 9 is a perspective three-dimensional diagram to aid in explaining the operation of the system of FIG. 6.

An implementation of Equation 11 by the system of FIG. 6, as described hereinafter, may be explained by reference to FIG. 9. Assume for example that, initially, the values of the gains $g_1$, $g_2$ are arbitrarily both set at the nominal value $+\frac{1}{2}$, as represented by point A of FIG. 9. If the gain $g_1$ is now alternately increased and decreased with respect to such nominal value and the corresponding squared-sum error $E^2$ is measured to sense the direction of decreasing $E^2$, $g_1$ may accordingly be adjusted until it reaches such a value that the squared-sum error is a minimum, as represented by point B of FIG. 9. At this point, such value of the gain $g_1$ is kept fixed and the value of the gain $g_2$ is similarly alternately increased and decreased with respect to its nominal value and adjusted in the direction of decreasing $E^2$ until the residual squared-sum error is again at a minimum value, as represented by point C. At this point, keeping the gain $g_2$ fixed, the gain $g_1$ is again readjusted above and below its last setting until a third minimum squared-sum error is reached, as represented by point D of FIG. 9. In this way, successively lower minima of residual squared-sum errors may be achieved.

An important feature of the invention is that the correction network is so chosen that the transfer function of Equation 10 is a linear function in terms of the gain parameters $g_1, g_2 \ldots g_N$. As a consequence, the error surfaces for any value of N (such as those of FIGS. 4 and 9 for $N=2$) are quadratic surfaces and positive, having only a single minimum. Therefore, the process described of seeking progressively smaller minima is a converging process leading to a unique minimum and there is no possibility of its being arrested at a false and higher valued minimum.

Returning to FIG. 6, the signal-translating system there represented includes a cathode-ray display tube 23, to the vertical deflection circuit of which is connected the output from the terminal 14. A suitable time base (not shown) is also provided to effect horizontal scanning. The wave form illustrated on the face of the tube 23 comprises a large-amplitude primary pulse and several small-amplitude spurious side pulses and is representative of $I \cdot H_{cor,\ N}$.

In describing the system, it will be assumed that a series of test δ-function pulses of a given repetition rate are transmitted and received prior to actual use of the system in signal translation. The system includes a blocking oscillator 24 having a natural frequency approximating the repetition rate of the transmitted test pulses and is synchronized from an input sync terminal 25, to which is applied a signal synchronized with the repetition rate of the test pulses. For example, the terminal 25 may be connected directly to the output terminal 14. An adjustable delay device 26 is included in the connection between the terminal 25 and the blocking oscillator 24 to ensure proper phasing.

The blocking oscillator 24 develops a square-wave output which is coupled to the intensity modulation terminal of the cathode-ray tube 26. The duration of the positive pulse of the output of blocking oscillator 24 is such as to brighten the display on the tube 23, as indicated in heavy lines, during the period $t_1-t_2$, constituting substantially the duration of the primary pulse, thereby indicating the relative phase between the blocking oscillator and the received signal.

The system of FIG. 6 further includes a blanking gate 27 connected to the output terminal 14 and a square-wave output of opposite polarity is applied to the gate 27 from the blocking oscillator 24. By this connection, the output from the terminal 14 is translated to the output terminal 27a of gate 27 during all times except during the receipt of the primary pulse, so that the signal at terminal 27a comprises only the undesired spurious side pulses. This signal is applied to a square-law network 28, the effect of which is to produce a signal including components representative of the squares of the several spurious side pulses. Such a square-law network is illustrated and described in Electronic Equipment Engineering for January 1964, page 4, and in "Circuit Square DC Input Voltage," Ideas for Design, Hayden Book Company, 1962, pages 55–56. The squared side pulse error signal is applied to a low-pass filter 29 which is effective to provide a cumulative long-term running sum or average of the squared-sum error and this signal is, in turn, applied to a balanced modulator 30.

The system of FIG. 6 further includes a square-wave generator 31 having a frequency equal to the repetition rate of the test pulses. This signal is applied to a transmission gate 32, to which is also applied a switching signal from terminal 33 to initiate synthesis of the optimizing network. The gate 32, when enabled, applies the output from the square-wave generator 31 to the balanced modulator 30, the output of which is applied to a low-pass filter 34. After a time roughly equal to the reciprocal of the cutoff frequency of filter 34, the output of filter 34 has reached a steady state signal indicating both the magnitude and polarity of the derivative of the squared-sum error with respect to the gain setting of $19_1$. The output of filter 34 is applied to a D.C. amplifier 35, the output of which is applied to a transmission gate 36.

The system further includes a multivibrator 37 which is effective to count down the output of the square-wave generator 31 and generate a square wave of half-period long enough to achieve a steady state of the output of filter 34. The output of the multivibrator 37 is also applied to the transmission gate 36 and, during the positive portions of the multivibrator output, the gate 36 applies the signal from the D.C. amplifier 35 to a hold circuit 38. This latter circuit may be of any conventional type or it may be a circuit such as shown in FIG. 7 of aforesaid copending application Ser. No. 201,148. The output of the hold circuit 38, which is a slowly varying D.C. signal, is applied via a combining amplifier 39 to the adjustable-gain amplifier $19_1$. The square-wave output from the generator 31 is also applied to the amplifier 39 via the transmission gate 32 and a transmission gate 40 enabled by the multivibrator 37.

For simplicity of explanation, for the case where $N=2$, FIG. 6 shows that the output of the multivibrator 37 is also applied, via a polarity-reversing amplifier 41, to transmission gates 42 and 43. The squared-sum error output of amplifier 35 is also applied, via transmission gate 42 and a hold circuit 44, a combining amplifier 45. Similarly, the square-wave output of the generator 31 is also applied to the combining amplifier 45 via gates 32 and 43. The output of the combining amplifier 45 is applied to the adjustable-gain amplifier $19_N$. It is noted that the connections from the amplifier 35 and the square-wave generator 31 to the adjustable-gain amplifier $19_N$ are the same as those to the amplifier $19_1$ except for the inclusion of the polarity-reversing amplifier 41 which causes the former circuit to operate on half cycles of the output of the multivibrator 37 opposite to that of the amplifier $19_1$.

Figure 10:
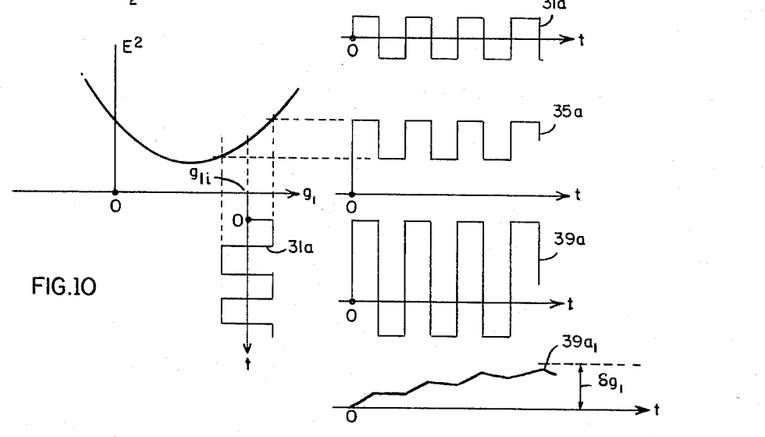
Figure 11:
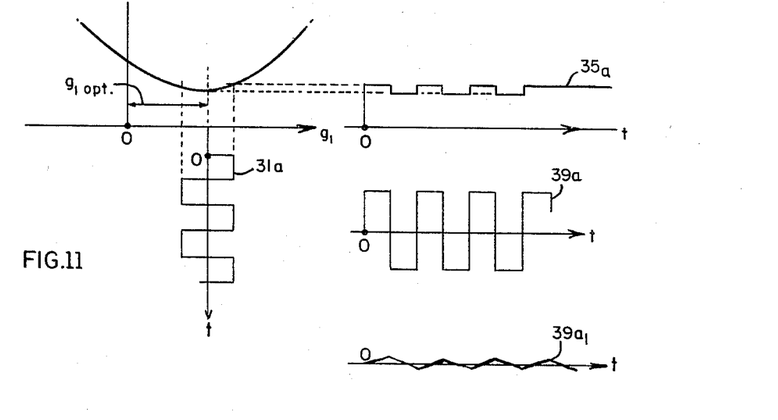

The operation of the signal-translating system of FIG. 6 may be better understood by reference to FIGS. 10 and 11 of the drawings. Assuming that an enabling signal has been applied via switch terminal 33 to enable the gate 32, this gate then applies the output signal of the generator 31, represented by curve 31a in FIG. 10, to the multivibrator 37 and then to the gate 40. The multivibrator 37 counts down the output of the generator 31 and the positive half-cycle of its output enables the gates 36 and 40. The derivative of the cumulative average squared-sum error from amplifier 35 is applied, via gate 36 and hold circuit 38, to the combining amplifier 39 and, thence, to the amplifier $19_1$. Assuming that the gain $g_1$ of amplifier $19_1$ is adjusted to the initial value of $g_{11}$ of FIG. 10, simultaneously the signal 31a is applied via gate 32 and gate 40 to the combining amplifier 39 and, thence, to amplifier $19_1$ to effect a rocking or perturbation of the gain thereof. This results in a squared-sum error signal from low-pass filter 29 which is indicated as 35a of FIG. 10. The output 39a of balanced modulator 30 is the product of the signals 31a and 35a which, after low-pass filter 34, becomes $39a_1$. After a time equal to the reciprocal of twice the cutoff frequency of the averaging filter 34, the signal $39a_1$ will have reached its steady state value $\delta g_1$ which is proportional in magnitude to, and has the same polarity as, the derivative of the squared-sum error and, accordingly, indicates the departure of the initial value of $g_1$ from optimum. Accordingly, the initial value $g_{11}$ is changed by a value proportional to $\delta g_1$ in a sense decreasing the residual squared-sum error, and this process continues until the condition of FIG. 11 is reached. As represented in FIG. 11, the system has reached a state of equilibrium so that the optimum value of $g_{1,\,opt}$ has been established. Since the signal 31a from generator 31 swings $g_1$ over a range representing the portion of the squared-sum error surface of minimum slope, only a very small or second-order variation of this squared-sum error results, as represented by curve 35a. The product of curve 31a and curve 35a, as represented by curve 39a of FIG. 11, is a substantially pure alternating quantity so that the cumulative average effected by low-pass filter 34 is only a very slight ripple signal, represented by curve $39a_1$, indicating that equilibrium has been reached, as indicated by point B of FIG. 9. As stated above, the period of the multivibrator 37 is selected so that the system reaches equilibrium, represented by curve $39a_1$ of FIG. 11, within one-half cycle of the multivibrator.

After equilibrium of the system has been reached, as just described, the multivibrator 37 reverses in polarity, disabling the gates 36 and 40. The hold circuit 38 maintains the gain of the amplifier $19_1$ at $g_{1,\,opt}$. At the same time, the negative half-cycle of the multivibrator 37, via reversing amplifier 41, enables gates 42 and 43 so that the D.C. signal output of amplifier 35, representative of the derivative of the residual squared-sum error is applied via hold circuit 44 to the combining amplifier 45, to which is also applied the signal 31a from generator 31 via gates 32 and 43. The adjustable-gain amplifier $19_N$ now operates in the same manner as the amplifier $19_1$ described above, causing the residual squared-sum error to oscillate back and forth about the value corresponding to the nominal setting of the gain of amplifier $19_N$ until it reaches the point of equilibrium represented by point C of FIG. 9.

In practice, a larger number of network sections 13 will be provided and the foregoing process is effected by applying the indicated optimizing procedures to the several sections in sequence until the final section $13_N$ is reached, whereupon the control system is switched back to the initial section $13_1$ and the process is repeated until the residual side pulses, as displayed on the cathode-ray tube 23, are reduced to minimum amplitudes. The process is then interrupted by removing the enabling signal from the switch terminal 33. Thus, in the system of FIG. 6, the gains of the several delay network sections $13_1 \ldots 13_N$ are automatically adjusted in sequence to their optimum values, resulting in a minimum over-all residual squared-sum error.

During the foregoing optimum adjusting process and, in fact, at all times, it is desirable that the amplitude of the primary pulse at the output terminal 14 be maintained approximately constant. This is done by the inclusive of a peak detector 46 coupled to output terminal 14 and a hold circuit 47, coupled back to the adjustable-gain AGC amplifier 11. These circuit elements thus provide a conventional automatic-gain-control circuit responsive to the peak amplitude of the primary pulse at the output terminal 14.

In some applications, it may be desired to effect the optimizing process described manually. For this purpose, a zero-center direct-current voltmeter 48 may be coupled to the output of the low-pass filter 34 and the gains of the amplifiers $19_1 \ldots 19_N$ oscillated manually above and below their initial setting to obtain a minimum reading of the meter 48. The adjustment of the amplifiers $19_1 \ldots 19_N$ is effected in sequence, as in the case of automatic operation. In this instance, feedback is via the voltmeter 48, the operator, and the setting of the gains of the amplifiers 19. Alternatively, the system of FIG. 6 may be modified to minimize the amplitude of the maximum-amplitude side pulse rather than the squared-sum error, as described. Such a modification requires only the replacement of the squaring network 28 by a conventional peak detector.

Stated in other words, the signal-translating system of FIG. 6 comprises means for detecting a predetermined characteristic, such as the residual squared-sum error of the side pulses or the minimum side pulse magnitude sum, at its output circuit, as represented by the expression $I \cdot H_{cor, N}$, and means for adjusting the gain of the delay network to a value represented by Equation 6 for $N=1$ and Equations 12 and 13 for $N=2$, etc. Specifically, the system includes means for adjusting the gains of the signal-repeating means of the several network sections above and below a nominal value, and means for adjusting the gains of such signal-repeating means in sequence in a sense progressively to reduce the value of such residual squared-sum error at the output circuit, and means for repeating the cycle of sequential gain settings to achieve progressively lesser minimum values of such squared-sum error.

Further, in systems in which the received signal comprises an array of pulses including a primary pulse and spurious side pulses, at least one of the side pulses having a magnitude substantially equal to or greater than that of the primary pulse, the system includes a wave-signal translating filter network, specifically the matched filter 12, coupled to the input circuit and having a signal-translating characteristic represented approximately by the time-reversed magnitudes of such array of pulses, the N-section wave-signal delay network in this instance being coupled between such filter network and the output circuit.

Further, in systems in which the received signal includes only a predominant major side pulse of lesser amplitude than the primary pulse, the delay network has a central connection tap and a second connection tap and a translation characteristic represented by Equation 4 and means for adjusting the gain of the second connection tap to a value represented by Equation 5.

Further, the signal-translating system of FIG. 6 may be simplified when employing only a two-section network by providing means for adjusting the gain of the first section of the delay network to a value represented by Equation 12, means for adjusting the gain of the second section of the delay network to a value represented by Equation 13, whereby the system has a translation characteristic represented by the relation:

$$H_{cor} = z^{-2m}(1 - g_{1, opt}R + g_{2, opt}R_2) \quad (14)$$

Figure 12:
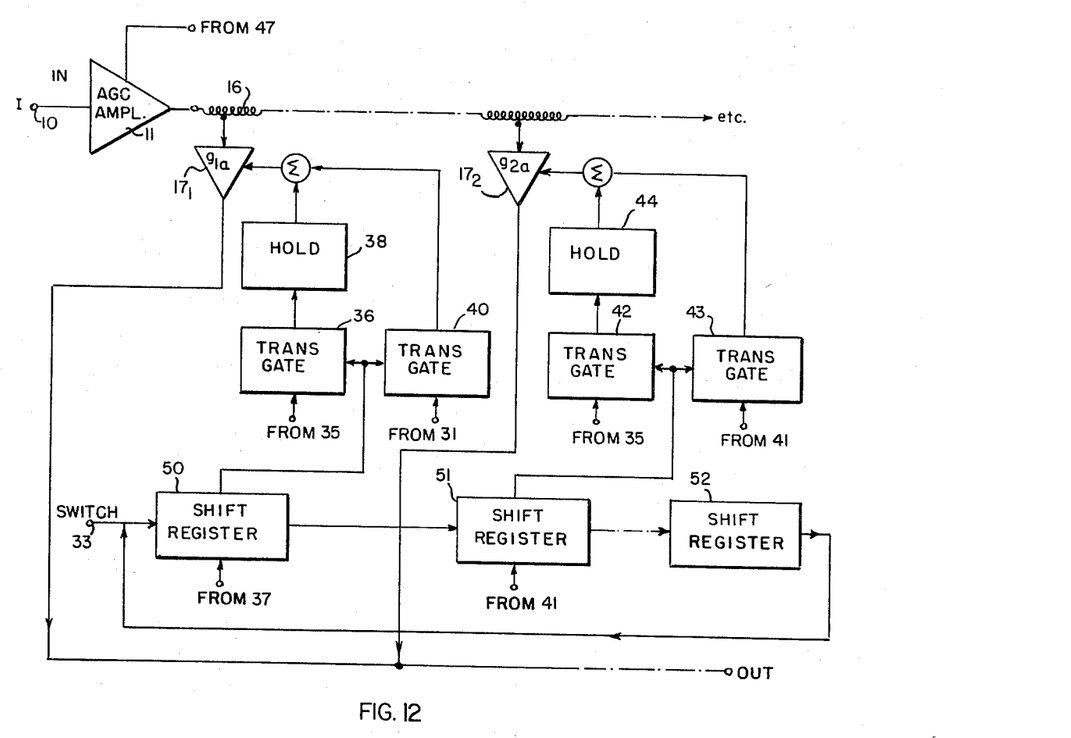
FIG. 12 is a schematic circuit diagram of a system for translating a signal comprising a primary pulse and spurious minor side pulses, in which the spurious side pulses are relaxed sequentially.

While the gains of the amplifiers of the delay network sections $13_1 \ldots 13_N$ have been set at their optimum values in sequence, the values of the gains of the signal repeaters connected to the individual taps of the delay network of each section, as represented in FIGS. 7 and 8, are adjusted in unison. For economy, it is further possible to use $N=1$ in FIG. 6 and effect optimization or minimal residual squared-sum error by adjusting the gains of the repeaters at the several taps to their optimum values in sequence. A matched filter, such as filter 12 of FIG. 6, may be used to assure presence of a main signal pulse larger than any of the side pulses. A circuit for effecting this result is represented in FIG. 12 which may, for example, represent the delay network $13_1$ of FIG. 8, only the repeaters $17_1$ and $17_2$ of the first two taps being shown for the sake of simplicity. The circuit components of FIG. 12 corresponding in function to the components of FIG. 6 are identified by the same reference numerals, while the connections into the system of FIG. 6 are indicated.

It may be assumed (although it is not necessary) that the gains of the repeaters $17_1$ and $17_2$ of FIG. 12, as well as others not shown, are initially adjusted in unison to the optimum value $g_{1, opt}$ as represented by Equation 6, as described above. The gains of the repeaters $17_1$ and $17_2$ may then be readjusted in sequence to their respective optimum values by the same logic and by essentially the same apparatus as used in adjusting the gains $g_1$ and $g_2$ in the system of FIG. 6, the difference being principally the addition of the shift registers 50 and 51 between the control switch terminal 33 and the transmission gates 36, 40 and 42, 43, respectively, and the shift register 52 completing the loop from the shift register associated with the final tap of the delay network back to the shift register 50 associated with the initial tap. Each of the shift registers 50, 51, and 52 may be of the type described in "Arithmetic Operations in Digital Computers," by R. K. Richards, D. Van Nostrand, 1955, pp. 144–148, or "Transistor Circuit Design," by Engineering Staff, Texas Instruments, McGraw-Hill, 1963, pp. 373–377.

It is believed that the operation of the system of FIG. 6 embodying the circuitry of FIG. 12 will be apparent from the foregoing description. In brief, operation is initiated by applying a switching pulse to the input terminal 33, which activates the shift register 50 to enable the gates 36, 40 which also receive necessary signals from the units 35 and 31, respectively, of the system of FIG. 6. Thereby, the gain of the repeater $17_1$ is automatically adjusted to a new optimum value $g_{1a}$, as described above.

It may be assumed that equilibrium is reached during one-half cycle of the output of the multivibrator 37 and, upon the occurrence of the succeeding half cycle of opposite polarity and a pulse from the shift register 50, the shift register 51 is activated to repeat the optimizing process with respect to the signal repeater $17_2$ to readjust its gain to the optimum value $g_{2a}$. This process may be repeated with respect to the signal repeaters connected to each of the taps of the delay line 16 and, when the gain of the final signal repeater is so adjusted, the shift register 52 shifts the control back to the initial shift register 50. Since the optimum values of gains of the several repeaters $17_1$, $17_2$, etc. are interrelated, the foregoing cycle of operations may be repeated several times to arrive at final optimum values for the gain of each of the signal repeaters.

The signal applied to the input terminal 10 of FIG. 12 may be either a distorted and dispersed received signal (I) or such a signal as modified by the matched filter 12 of FIG. 6. Alternatively, instead of adjusting the gains of the signal repeaters of the several taps of each of the delay networks $15_1 \ldots 15_N$ in sequence, as just described, a similar refinement may be obtained by applying the same tap-by-tap optimizing process to the signal repeaters connected to the several taps of the matched filter 12, described in detail in aforesaid copending application Ser. No. 180,456.

While there have been described what are, at present, considered to be the preferred embodiments of the invention, it will be obvious to those skilled in the art that various changes and modifications may be made therein, without departing from the invention, and it is therefore, aimed in the appended claims to cover all such changes and modification as fall within the true spirit and scope of the invention.

What is claimed is:

1. A system for translating a signal $I(z)$ comprising a primary pulse of reference magnitude and a stream of spurious side pulses $a_{-m} \ldots a_{-1}, a_1 \ldots a_m$, all of lesser magnitude and represented in Z-transform notation by the expression:

$$I(z) = 1 + R(z)$$

where $$R(z) = a_{-m}z^m + \ldots + a_{-1}z^1 + 0 + a_1z^{-1} + \ldots + a_mz^{-m}$$

with substantial suppression of said side pulses, comprising:
  an input circuit for supplying a signal to be translated;
  an output circuit;
  an N-section wave-signal delay network coupled between said input and output circuits, each section including a central connection tap providing a delay $z^{-m}$ and at least $2m$ connection taps symmetrically spaced relative to said central tap;
  means in the first section of said network for sensing the instantaneous side pulse voltage $a_{-m} \ldots a_{-1}$, $a_1 \ldots a_m$ at said symmetrically spaced connection taps in response to the distribution of an input signal along said network section;
  signal-repeating means at each of the connection taps of each of the N-sections for coupling said plurality of taps to said output circuit;
  a signal translating circuit for deriving a signal $I \cdot z^{-mN}$ and supplying it to said output circuit,
  whereby the translation characteristic is represented by the expression:

$$H_{\text{cor, N}} = (1 - g_1 R + \ldots + (-1)^N g_N z^N) z^{-mN}$$

where the several parameters have the significance set forth in the specification;
  means for detecting a predetermined characteristic of the residual side pulses of the output $I \cdot H_{\text{cor, N}}$;
  and means for adjusting the N gains $g_1 \ldots g_N$ in a sense to reduce the value of said predetermined characteristic.

2. A system for translating a signal comprising a primary pulse and spurious minor side pulses with substantial suppression of said side pulses comprising:
  an input circuit for supplying a signal to be translated;
  an output circuit;
  an N-section wave-signal delay network coupled between said input and output circuits, each section including a central connection tap and a plurality of connection taps symmetrically spaced relative to said central tap;
  a circuit in each section for deriving a signal corresponding to an input signal with a delay equal to that at said central tap;
  means in the first section of said network for sensing the instantaneous signal voltages at said central tap and at each of said plurality of taps on one side thereof in response to the distribution of an input signal along said network section;
  a plurality of signal-repeating means in each section of said network individually responsive to the polarity of such instantaneous signal at each given one of said plurality of taps for coupling the corresponding symmetrically disposed tap to said output circuit with controlled polarity;
  means in each section of said network for summing the signal outputs of said signal-repeating means and adding the summation signal to said derived signal;
  means for applying to said output circuit the sum of said summation signal and said derived signal of the final section of said network;
  means for detecting a predetermined characteristic of said side pulses at said output circuit;
  means for adjusting the gain of all said signal-repeating means above and below a nominal value;
  and means for setting the gains of all said signal-repeating means in unison in a sense to reduce the value of said predetermined characteristic at said output circuit.

3. A system for translating a signal comprising a primary pulse and spurious minor side pulses with substantial suppression of said side pulses comprising:
  an input circuit for supplying a signal to be translated;
  an output circuit;
  an N-section first wave-signal delay network coupled between said input and output circuits, each section including a central connection tap and a plurality of connection taps symmetrically spaced relative to said central tap;
  each section including a second wave-signal delay network having a time delay one-half that of said first delay network;
  means in the first section of said network for sensing the instantaneous signal voltages along said first delay network at said central tap and at each of said plurality of taps on one side thereof in response to the distribution of an input signal along said network section;
  a plurality of signal-repeating means in each section of said first network individually responsive to the polarity of such instantaneous signal at each given one of said plurality of taps for coupling the corresponding symmetrically disposed tap to said output circuit with controlled polarity;
  means in each section of said first delay network for summing the signal outputs of the signal-repeating means thereof;
  means for applying to said output circuit the sum of the outputs of the final sections of said first and second delay networks;
  means for detecting a predetermined characteristic of said side pulses at said output circuit;
  means for adjusting the gain of all said signal-repeating means above and below a nominal value;
  and means for setting the gains of said signal-repeating means in unison in a sense to reduce the value of said predetermined characteristic at said output circuit.

4. A system for translating a signal comprising a primary pulse and spurious minor side pulses with substantial suppression of said side pulses comprising:
  an input circuit for supplying a signal to be translated;
  an output circuit;
  an N-section wave-signal delay network coupled between said input and output circuits, each section including a central connection tap and a plurality of connection taps symmetrically spaced relative to said central tap;

means in the first section of said network for sensing the instantaneous signal voltages at said central tap and at each of said plurality of taps on one side thereof in response to the distribution of an input signal along said network section;

a plurality of signal-repeating means in each section of said network individually responsive to the polarity of such instantaneous signal at each given one of said plurality of taps for coupling the corresponding symmetrically disposed tap to said output circuit with controlled polarity;

means in each section of said network for summing the signal outputs of said signal-repeating means and adding the summation signal to the signal at said central connection tap;

means for applying the resultant signal from the final section of said network to said output circuit;

means for detecting a predetermined characteristic of said side pulses at said output circuit;

means for adjusting the gain of all said signal-repeating means above and below a nominal value;

and means for setting the gains of all said signal-repeating means in unison in a sense to reduce the value of said predetermined characteristic at said output circuit.

5. A system for translating a signal comprising a primary pulse and spurious minor side pulses with substantial suppression of said side pulses comprising:

an input circuit for supplying a signal to be translated;

an output circuit;

an N-section wave-signal delay network coupled between said input and output circuits, each section including a central connection tap and a plurality of connection taps symmetrically spaced relative to said central tap;

a circuit for deriving a signal corresponding to an input signal with a delay equal to that at said central tap;

means in the first section of said network for sensing the instantaneous signal voltages at said central tap and at each of said plurality of taps on one side thereof in response to the distribution of an input signal along said network section;

a plurality of signal-repeating means in each section of said network responsive to the polarity of such instantaneous signal at each given one of said plurality of taps for coupling the corresponding symmetrically disposed tap to said output circuit with controlled polarity;

means in each section of said network for summing the signal outputs of said signal-repeating means and adding the summation signal to said derived signal;

means for applying to said output circuit the sum of said summation signal and said derived signal of the final section of said network;

means for detecting a predetermined characteristic of said side pulses at said output circuit;

means for adjusting the gains of all said signal-repeating means above and below a nominal value;

and means for setting the gains of each of said signal-repeating means in sequence in a sense progressively to reduce the value of said predetermined characteristic at said output circuit.

6. A system for translating a signal comprising a primary pulse and spurious minor side pulses with substantial suppression of said side pulses comprising:

an input circuit for supplying a signal to be translated;

an output circuit;

an N-section wave-signal delay network coupled between said input and output circuits, each section including a central connection tap and a plurality of connection taps symmetrically spaced relative to said central tap;

a circuit for deriving a signal corresponding to an input signal with a delay equal to that at said central tap;

means in the first section of said network for sensing the instantaneous signal voltages at said central tap and at each of said plurality of taps on one side thereof in response to the distribution of an input signal along said network section;

a plurality of signal-repeating means in each section of said network individually responsive to the polarity of such instantaneous signal at each given one of said plurality of taps for coupling the corresponding symmetrically disposed tap to said output circuit with controlled polarity;

means in each section of said network for summing the signal outputs of all said signal-repeating means and adding the summation signal to said derived signal;

means for applying to said output circuit the sum of said summation signal and said derived signal of the final section of said network;

means for detecting a predetermined characteristic of said side pulses at said output circuit;

means for adjusting the gain of all said signal-repeating means above and below a nominal value;

means for setting the gains of each of said signal-repeating means in sequence in a sense progressively to reduce the value of said predetermined characteristic at said output circuit;

and means for repeating the cycle of sequential gain settings to achieve progressively lesser minimum values of said characteristic.

7. A system for translating a signal comprising a primary pulse and spurious minor side pulses with substantial suppression of said side pulses comprising:

an input circuit for supplying a signal to be translated;

an output circuit;

an N-section wave-signal delay network coupled between said input and output circuits, each section including a central connection tap and a plurality of connection taps symmetrically spaced relative to said central tap;

a circuit in each section for deriving a signal corresponding to an input signal with a delay equal to that at said central tap;

means in the first section of said network for sensing the instantaneous signal voltages at said central tap and at each of said plurality of taps on one side thereof in response to the distribution of an input signal along said network section;

a plurality of signal-repeating means in each section of said network individually responsive to the polarity of such instantaneous signal at each given one of said plurality of taps for coupling the corresponding symmetrically disposed tap to said output circuit with controlled polarity;

means in each section of said network for summing the signal outputs of said signal-repeating means and adding the summation signal to said derived signal;

means for applying to said output circuit the sum of said summation signal and said derived signal of the final section of said network so as to achieve a translation characteristic represented by the expression:

$$H_{cor} = (1 - g_{opt}R)z^{-m}$$

and means for adjusting the gain of said delay network to a value:

$$g_{opt} = \frac{(RR_c)_o + (R^2R_c)_o}{(RR_c)_o + 2(R^2R_c)_o + (R^2R_c^2)_o}$$

where the several parameters have the significance set forth in the specification.

8. A system for translating a signal comprising an array of pulses including a primary pulse and spurious minor side pulses, at least one of said side pulses having a magnitude at least substantially equal to that of said primary pulse, with substantial suppression of said side pulses comprising:

an input circuit for supplying said array of pulses to be translated;

an output circuit;

a first wave-signal translating filter network coupled to said input circuit and having a signal-translating characteristic represented approximately by the time-reversed magnitudes of said array of pulses;

an N-section wave-signal delay network coupled between said filter network and said output circuit, each section including a central connection tap and a plurality of connection taps symmetrically spaced relative to said central tap;

a circuit for deriving a signal corresponding to an input signal with a delay equal to that at said central tap;

means in the first section of said delay network for sensing the instantaneous signal voltages at said central tap and at each of said plurality of taps on one side thereof in response to the distribution of an input signal along said network section;

a plurality of signal-repeating means in each section of said delay network individually responsive to the polarity of such instantaneous signal at each given one of said plurality of taps for coupling the corresponding symmetrically disposed tap to said output circuit with controlled polarity;

means in each section of said delay network for summing the signal outputs of all said signal-repeating means and adding the summation signal to said derived signal;

means for applying to said output circuit the sum of said summation signal and said derived signal of the final section of said delay network;

means for detecting a predetermined characteristic of said side pulses at said output circuit;

means for adjusting the gains of all said signal-repeating means above and below a nominal value;

and means for setting the gains of all said signal-repeating means in unison in a sense to reduce the value of said predetermined characteristic at said output circuit.

9. A system for translating a signal comprising an array of pulses including a primary pulse and spurious minor side pulses, at least one of said side pulses having a magnitude at least substantial equal to that of said primary pulse, with substantial suppression of said side pulses comprising:

an input circuit for supplying said array of pulses to be translated;

an output circuit;

a first wave-signal translating filter network coupled to said input circuit and having a signal-translating characteristic represented approximately by the time-reversed magnitudes of said array of pulses;

an N-section wave-signal delay network coupled between said filter network and said output circuit, each section including a central connection tap and a plurality of connection taps symmetrically spaced relative to said central tap;

a circuit in each section for deriving a signal corresponding to an input signal with a delay equal to that at said central tap;

means in the first section of said network for sensing the instantaneous signal voltages at said central tap and at each of said plurality of taps on one side thereof in response to the distribution of an input signal along said network section;

a plurality of signal-repeating means in each section of said network individually responsive to the polarity of such instantaneous signal at each given one of said plurality of taps for coupling the corresponding symmetrically disposed tap to said output circuit with controlled polarity;

means in each section of said network for summing the signal outputs of said signal-repeating means and adding the summation signal to said derived signal;

means for applying to said output circuit the sum of said summation signal and said derived signal of the final section of said network;

and means for adjusting the gain of said delay network to a value:

$$g_{opt} = \frac{(RR_c)_o + (R^2R_c)_o}{(RR_c)_o + 2(R^2R_c)_o + (R^2R_c^2)_o}$$

where the several parameters have the significance set forth in the specification and the functions R and $R_c$ refer to the spurious side pulses of the signals applied to said N-section network.

10. A system for translating a signal comprising an array of pulses including a primary pulse and spurious minor side pulses, at least one of said side pulses having a magnitude at least substantially equal to that of said primary pulse, with substantial suppression of said side pulses comprising:

an input circuit for supplying said array of pulses to be translated;

an output circuit;

a first wave-signal translating filter network coupled to said input circuit and having a signal-translating characteristic represented approximately by the time-reversed magnitudes of said array of pulses;

an N-section wave-signal delay network coupled between said filter network and said output circuit, each section including a central connection tap and a plurality of connection taps symmetrically spaced relative to said central tap;

a circuit in each section for deriving a signal corresponding to an input signal with a delay equal to that at said central tap;

means in the first section of said network for sensing the instantaneous signal voltages at said central tap and at each of said plurality of taps on one side thereof in response to the distribution of an input signal along said network section;

a plurality of signal-repeating means in each section of said network individually responsive to the polarity of such instantaneous signal at each given one of said plurality of taps for coupling the corresponding symmetrically disposed tap to said output circuit with controlled polarity;

means in each section of said network for summing the signal outputs of said signal-repeating means and adding the summation signal to said derived signal;

means for applying to said output circuit the sum of said summation signal and said derived signal of the final section of said network;

and means for setting the gains of each of said signal-repeating means in sequence in a sense progressively to reduce the value of said predetermined characteristic at said output circuit.

11. A system for translating a signal comprising a primary pulse of reference magnitude and at most one major spurious side pulse of lesser magnitude $a_w$ represented by the expression:

$$I(z) = 1 + a_w z^{-w}$$

comprising:

an input circuit for supplying a signal to be translated;

an output circuit;

an N-section wave-signal delay network coupled between said input and output circuits, each section including a central connection tap and a second connection tap displaced from said central tap and having a translation characteristic represented by the expression:

$$H_{cor}=1-(a_w g_w)z^{-w}$$

means for adjusting the gain of said second connection tap to a value represented by the expression:

$$(a_w g_w,\, _{cpt})=\frac{a_w+(RR_c)_w}{1+(RR_c)_o}$$

where the several parameters have the significance set forth in the specification;

means in the first section of said network for sensing the instantaneous signal voltages at said central tap and at said second tap in response to the distribution of an input signal along said network section;

signal-repeating means in each section of said network individually responsive to the polarity of such instantaneous signal at said second connection tap for coupling the corresponding symmetrically disposed tap to said output circuit with controlled polarity;

means in each section of said network for summing the signal outputs of said signal-repeating means;

and means for applying to said output circuit the summation signal of the final section of said network.

12. A system for translating a signal comprising a primary pulse of reference magnitude and at least one major spurious side pulse of lesser magnitude with substantial suppression of said side pulse comprising:

an input circuit for supplying a signal to be translated;
an output circuit;
an N-section wave-signal delay network coupled between said input and output circuits, each section including a central connection tap and a second connection tap electrically spaced from said central tap by the spacing between said primary and side pulses;
means in the first section of said network for sensing the instantaneous signal voltages at said central tap and at said second tap in response to the distribution of an input signal along said network section;
signal-repeating means in each section of said network individually responsive to the polarity of such instantaneous signal at said second connection tap for coupling the corresponding symmetrically disposed tap to said output circuit with controlled polarity;
means in each section of said network for summing the signal outputs of said signal-repeating means;
means for detecting a predetermined characteristic of said side pulse at said output circuit;
means for adjusting the gains of said signal-repeating means connected to said second connection tap;
and means for setting the gains of each of said signal-repeating means in sequence in a sense progressively to reduce the value of said predetermined characteristic at said output circuit.

13. A system for translating a signal comprising an array of pulses including a primary pulse and spurious minor side pulses, at least one of said side pulses having a magnitude at least substantially equal to that of said primary pulse, with substantial suppression of said side pulses comprising:

an input circuit for supplying said array of pulses to be translated;
an output circuit;
a first wave-signal translating filter network coupled to said input circuit and having a signal-translating characteristic represented approximately by the time-reversed magnitudes of said array of pulses;
a two-section wave-signal delay network coupled between said filter network and said output circuit, each section having a central connection tap and a plurality of connection taps symmetrically spaced relative to said central tap;
a circuit in each of said sections for deriving a signal corresponding to an input signal with a delay equal to that at said central tap;

means in the first of said sections for sensing the instantaneous signal voltages at said central tap and at each of said plurality of taps on one side thereof in response to the distribution of an input signal along said network section;
a plurality of signal-repeating means in each of said sections individually responsive to the polarity of such instantaneous signal at each given one of said plurality of taps for coupling the corresponding symmetrically disposed tap to said output circuit with controlled polarity;
means in each of said sections for summing the signal outputs of said signal-repeating means and adding the summation signal to said derived signal;
means for applying to said output circuit the sum of said summation signal and said derived signal of the final section of said network;
means for adjusting the gain of the first section of said delay network to a value:

$$g_{1,\, opt}=\frac{2K_3 K_4 - K_2 K_5}{4K_1 K_3 - K_2{}^2}$$

and means for adjusting the gain of the second section of said delay network to a value:

$$g_{2,\, opt}=\frac{K_2 K_4 - 2K_1 K_5}{4K_1 K_3 - K_2}$$

whereby the system has a translation characteristic represented by the expression:

$$H_{cor}=z^{-2m}(1-g_1 R + g_2 R^2)$$

where the several parameters have the significance set forth in the specification and the function R refers to the spurious side pulses of the signal as applied to said two-section network.

14. A system for translating a signal comprising a primary pulse of reference magnitude and spurious minor side pulses of lesser magnitude with substantial suppression of said side pulses comprising:

an input circuit for supplying a signal to be translated;
an output circuit;
a two-section wave-signal delay network coupled between said input and output circuits, each section including a central connection tap and a plurality of connection taps symmetrically spaced relative to said central tap;
a circuit in each section for deriving a signal corresponding to an input signal with a delay equal to that at said central tap;
means in the first section of said network for sensing the instantaneous signal voltages at said central tap and at each of said plurality of taps on one side thereof in response to the distribution of an input signal along said network section;
a plurality of signal-repeating means in each section of said network individually responsive to the polarity of such instantaneous signal at each given one of said plurality of taps for coupling the corresponding symmetrically disposed tap to said output circuit with controlled polarity;
means in each section of said network for summing the signal outputs of said signal-repeating means and adding the summation signal to said derived signal;
means for applying to said output circuit the sum of said summation signal and said derived signal of the final section of said network;

means for adjusting the gain of the first section of said delay network to a value:

$$g_{1,\,opt} = \frac{2K_3K_4 - K_2K_5}{4K_1K_3 - K_2^2}$$

and means for adjusting the gain of the second section of said delay network to a value:

$$g_{2,\,opt} = \frac{K_2K_4 - 2K_1K_5}{4K_1K_3 - K_2^2}$$

whereby the system has a translation characteristic represented by the expression:

$$H_{cor} = z^{-2m}(1 - g_{1,\,opt}R + g_{2,\,opt}R^2)$$

where the several parameters have the significance set forth in the specification.

No references cited.

ARTHUR GAUSS, *Primary Examiner.*
J. JORDAN, *Assistant Examiner.*